(12) United States Patent
Wu et al.

(10) Patent No.: US 7,783,773 B2
(45) Date of Patent: Aug. 24, 2010

(54) GLITCH-FREE MEDIA STREAMING

(75) Inventors: Feng Wu, Beijing (CN); Guangping Gao, Beijing (CN); Yi Liu, HangZhou (CN)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 11/459,600

(22) Filed: Jul. 24, 2006

(65) Prior Publication Data

US 2008/0022005 A1    Jan. 24, 2008

(51) Int. Cl.
 G06F 15/16    (2006.01)
(52) U.S. Cl. .................... 709/231; 709/232; 709/203
(58) Field of Classification Search ............... 709/231
See application file for complete search history.

(56) References Cited

U.S. PATENT DOCUMENTS

| | | | |
|---|---|---|---|
| 4,774,587 A * | 9/1988 | Schmitt ................. | 358/426.09 |
| 6,128,653 A | 10/2000 | del Val et al. | |
| 6,374,300 B2 * | 4/2002 | Masters ................. | 709/229 |
| 6,415,326 B1 | 7/2002 | Gupta et al. | |
| 6,631,476 B1 | 10/2003 | Vandesteeg et al. | |
| 7,039,709 B1 | 5/2006 | Beadle et al. | |
| 2001/0052021 A1 | 12/2001 | Bolosky et al. | |
| 2002/0075857 A1 | 6/2002 | LeBlanc | |
| 2003/0091160 A1 | 5/2003 | Enbom et al. | |
| 2003/0135633 A1 | 7/2003 | Dror et al. | |
| 2004/0031054 A1 | 2/2004 | Dankworth et al. | |
| 2004/0088328 A1 | 5/2004 | Cook et al. | |
| 2004/0093420 A1 * | 5/2004 | Gamble ................. | 709/231 |
| 2004/0167890 A1 * | 8/2004 | Eyal ..................... | 707/3 |
| 2004/0231004 A1 | 11/2004 | Seo | |
| 2004/0261136 A1 | 12/2004 | Aratani et al. | |
| 2005/0028225 A1 | 2/2005 | Dawson et al. | |
| 2005/0071491 A1 | 3/2005 | Seo | |
| 2006/0174023 A1 * | 8/2006 | Horn et al. ........... | 709/231 |

OTHER PUBLICATIONS

PCT Search Report For Patent Application No. 2007015213 Mailed On Dec. 27, 2007, pp. 7.
Girdo, et al., "Advances in Channel-Adaptive Video Streaming" http://www3.interscience.wiley.com/cgi-gin/abstract/99019915/ABSTRACT?CRETREY=1&SRETRY=0.
Kalman, et al., "R-D Optimized Media Streaming Enhanced with Adaptive Media Playout" Available from http://ieeexplore.ieee.org/xpl/abs_free.jsp?arNumber=1035920.
Steinbach, et al., "Adaptive PLayout for Low Latency Video Streaming" Available from http://www.ikn.ei.tum.de/-steinb/PUBLICATIONS/icip2001.pdf.

* cited by examiner

Primary Examiner—Jeffrey Pwu
Assistant Examiner—Shripal K Khajuria
(74) Attorney, Agent, or Firm—Lee & Hayes, PLLC

(57) ABSTRACT

Glitch-free media streaming is provided by a client computing device ("client") independent of whether a remote computing device ("host") associated with media content provides real-time media content streaming services. Specifically, the client computing device ("client") provides a user with real-time media content streaming services by establishing multiple connections to the host to read respective portions of the media content by sending byte-range transport protocol requests to the host. As the reading operations progress, the client evaluates transmit rates over respective ones of the connections in view of a real-time media content playback rate to regulate data flow into a streaming media buffer and provide the user with a consistent high-quality (glitch-free) streaming media presentation.

17 Claims, 5 Drawing Sheets

GLITCH-FREE MEDIA STREAMING

BACKGROUND

Media content streaming services enable real-time playback of media content as it is downloading. Random seek capabilities in such streaming services facilitate rapid location of media clips related to user retrieval. Although such services are great for real-time media content playback, servers hosting Web pages that include media content do not always provide content streaming service for real-time playback of hosted media content. Instead, many such Web sites support only HTTP-based Web page browsing and file downloading operations. As a result, to view a piece of media content from such a server, a user generally has to download the media content from the server to a local machine. Then the user has to launch a local application to view the downloaded media content. Since media content files are typically very large, downloading an entire media file to view and/or search the content can be very time consuming for the user. However, it is not realistic for all Web-based media content hosts to also provide media content streaming service.

SUMMARY

Glitch-free media streaming is provided by a client computing device ("client") independent of whether a remote computing device ("host") associated with media content provides real-time media content streaming services. Specifically, the client computing device ("client") provides a user with real-time media content streaming services by establishing multiple connections to the host to read respective portions of the media content by sending byte-range transport protocol requests to the host. As the reading operations progress, the client evaluates transmit rates over respective ones of the connections in view of a real-time media content playback rate to regulate data flow into a streaming media buffer and provide the user with a consistent high-quality (glitch-free) streaming media presentation.

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

BRIEF DESCRIPTION OF THE DRAWINGS

In the Figures, the left-most digit of a component reference number identifies the particular Figure in which the component first appears.

DETAILED DESCRIPTION

Overview

Figure 1:
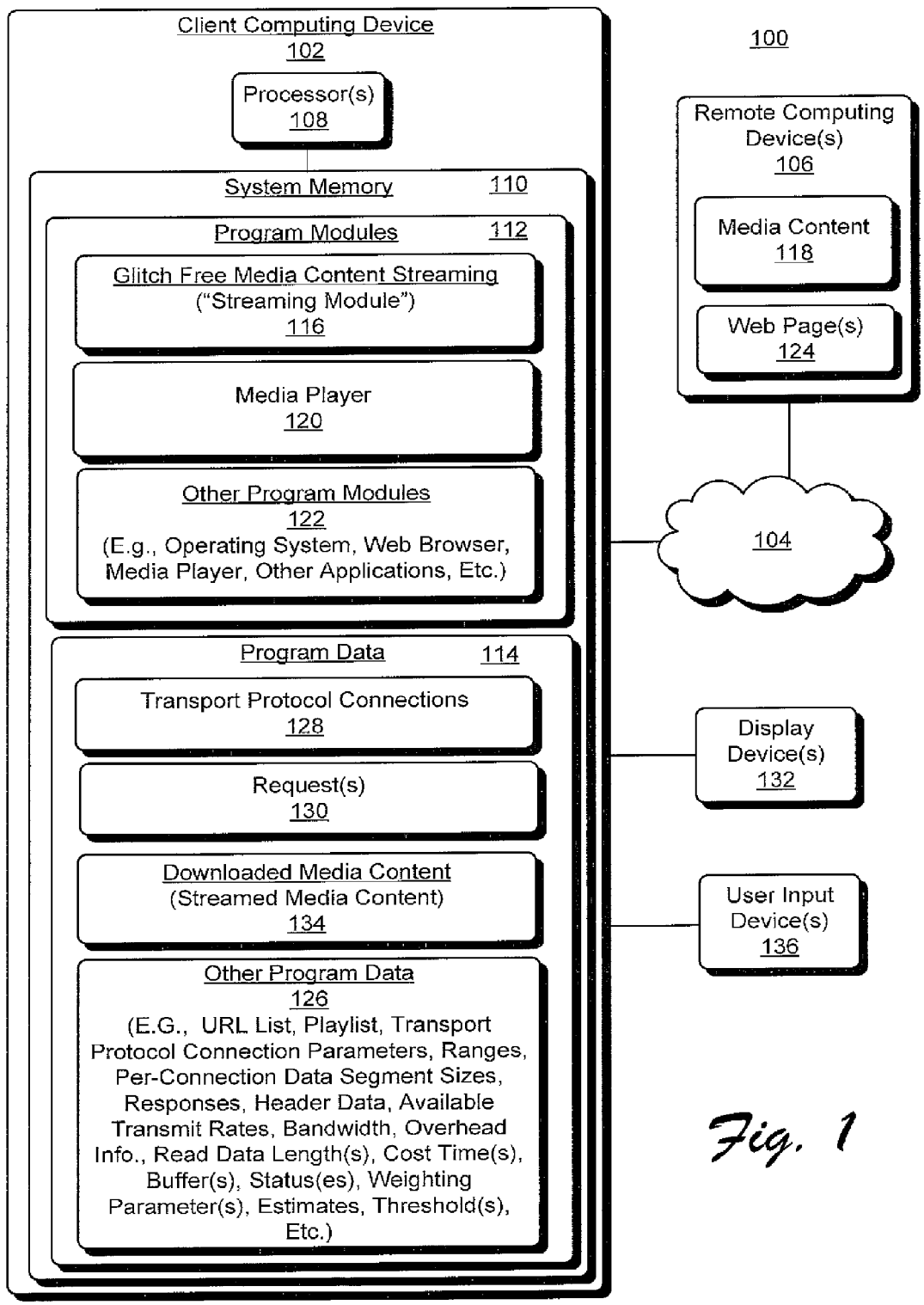
FIG. 1 shows an exemplary system for glitch-free media streaming, according to one embodiment.

HTTP is based upon Transmission Control Protocol (TCP) protocol providing flow control, congestion control, and retransmission capabilities. Use of TCP for streaming typically results in long latency times and low data rates, which inevitably results in glitches during media content playback operations. This is because when an HTTP server receives a request for a media file hosted by a Web page, wherein the media file is being downloaded by a user for real-time playback, the HTTP server responds to the request identical to how the HTTP server would respond to a request to browse a Web page, perform a normal (non-streaming) file download, etc. The HTTP server does not take the real-time requirement of media streaming into consideration when responding to the request. Available bandwidth is fairly allocated to each connection.

In the scenario where a media content file is being downloaded for real-time playback, if available bandwidth is not high enough, it is difficult to maintain smooth media playback. Although enlarging client buffer size and pre-buffering additional data could be helpful, initial delay (latency) and buffer underflow (data rates) would likely result in poor playback quality. Additionally, although varying media frame playback speeds based on communication channel data throughput may avoid decoding buffer underflow conditions, such techniques may result in slow media playback speeds, causing undesired visual artifacts during media playback operations.

Systems and methods for glitch-free media streaming are described below in reference to FIGS. 1-6. More particularly, the systems and methods provide a client-based solution to real-time glitch-free media content downloading and viewing. This solution provides a user with a high quality media content presentation without presentation latencies and/or dropped frames. To accomplish this, the client acquires media content from a host over multiple transport protocol connections at per-connection configured data rates that consider network bandwidth over time to provide consistent and controlled buffer management. The consistent and controlled buffer management regulates data input into the streaming media buffer to avoid buffer underflow and buffer overflow conditions, and thereby, provide for consistent real-time media content decoding and playback. This solution is independent of whether a Web server hosting media content of interest has access to real-time media content streaming and/or seeking services to respond to a client request to stream a piece of media content. Although the systems and methods leverage transport protocols that support range queries, this solution is also independent of any changes to Web servers, Web pages, and/or transmission protocols.

These and other aspects of glitch-free media content streaming are now described in greater detail.

An Exemplary System

Although not required, glitch-free media streaming is described in the general context of computer-executable instructions (program modules) being executed by computing devices such as a general-purpose computer or a mobile handheld device. Program modules generally include routines, programs, objects, components, data structures, etc., that perform particular tasks or implement particular abstract data types. While glitch-free media streaming is described in the foregoing context, acts and operations described hereinafter may also be implemented in hardware.

FIG. 1 shows an exemplary system 100 for glitch-free media streaming, according to one embodiment. System 100 includes computing device ("client") 102 coupled across network 104 to one or more remote computing devices 106. Network 104 may include any combination of a local area network (LAN) and a general wide area network (WAN) communication environments, such as those which are commonplace in offices, enterprise-wide computer networks, intranets, and the Internet. Each client and remote computing device 102 and 106 include a respective processor coupled to a system memory. Each processor is configured to fetch and execute computer-program instructions stored in system memory to perform respective operations associated with glitch-free media streaming.

For example, client 102 includes processor 108 coupled to system memory 110. System memory 110 includes program modules 112 and program data 114. In this implementation, program modules 112 include, for example, glitch-free media content streaming module ("streaming module") 116 to provide a client-based solution to search and view a piece of downloaded media content 134 hosted by one or more remote computing devices ("hosts") 106. Downloaded media content 134 at any one time represents requested portions of media content 118 from one or more hosts 106 (media content 118 may be hosted by more than one remote computing device 106). Program modules 112 also include, for example, media player 120 to present downloaded media content 134 to a user, and other program modules 122 such as an operating system (OS), a browser to search for media content 118, and/or so on.

In one implementation, a search service is implemented on a respective remote computing device 106 (or on client 102) to respond to user media content search queries (e.g., input by a user into a browser application, etc.). The search service indexes contents available on network 104 associated with key words. For instance, responsive to a user submitting a set of query key words, the search service evaluates the key words in view of the indexed content to returns a URL list of remote computing device(s) 106 that host media content 118 related to the key words. For purposes of exemplary illustration, such a URL list is shown as a respective portion of "other program data" 126. For purposes of exemplary description, when a particular remote computing device 106 hosts a piece of media content 118 of interest, the particular remote computing device 106 is frequently referred to hereinafter as a "host".

In one implementation, media content 118 is hosted by more than one remote computing device 106. When a user expresses interest in a particular piece of media content in the URL list (e.g., via selection or some other modality), streaming module 116 establishes connections with one or multiple hosts 106 to simultaneously download one or more portions of media content 118 for glitch-free presentation to a user. These connections are based on evaluated connection criteria between client 102 and respective ones of the hosts 106. This search scenario is only one example to identify one or more remote computing devices 106 that host a piece of media content 118. For example, such a URL list can also be obtained from a network community, a body list in a messaging application, and/or so on.

Responsive to determining that a user is interested in a particular piece of media content 118 for a browsing application, streaming module 116 initializes multiple transport protocol connections 128 to one or more remote computing devices 106 hosting the particular piece of media content 118 (the hosts are identified in the URL list). As described in greater detail below in the section titled "Establishing Multiple Connections", the number of transport protocol connections 128 to host 106 initialized by client 102 is based on competing criteria. In this implementation, these criteria include, for example, two or more of network bandwidth, request overhead, connection overhead, real-time playback quality, buffer size, and decoding buffer management complexity. Connections 128 are logically shown in FIG. 1 as lines coupling client 102 across network 104 to remote computing device(s) 106.

In one implementation, transport protocol connections 128 are Hyper Text Transfer Protocol (HTTP) protocol connections. In another implementation, transport protocol connections 128 are based on a different transport protocol that also supports use of byte-range range requests to read specific portions of media content 118. Although system 100 can use any of multiple types of transport protocols, system 100 is described using connections based on HTTP for purposes of exemplary description and illustration.

Before requesting download of respective portions of media content 118 over respective ones of the connections 128, streaming module 116 determines for each connection 128 a corresponding appropriate data segment of media content 118 to read/download over the connection 128. The data segment indicates an offset in the media file and length (byte size) of the data segment, which is less than the total size of the media content 118. In one implementation, as soon as a data segment is determined for a particular connection 128, the particular connection can be utilized to access respective data segment portions of media content 118 (for streaming presentation to a user) before other ones of the connections 128 have been tasked to read respective data segments. Data segment sizes determinations for each connection 128 at any particular time are based on respective transmit times over the connection 128. To address fluctuating conditions of network 104 effecting data request and data transmission rates over time, streaming module 116 periodically re-evaluates data segment sizes for respective ones of the connections 128. This periodicity is configurable. These and other aspects of tasking/configuring connections 128 to read data segment portions of media content 118 are discussed in greater detail below in the section titled "Available Connection Transmit Time".

To begin streaming media content 118 for glitch-free real-time presentation of corresponding downloaded media content 134 to a user (e.g., via a display device 132), streaming module 116 sends byte-range requests 130 to host 106 over respective ones of the established connections 128. For any particular connection 128, a byte range request 130 specifies a particular location (e.g., URI) of the content 118, a byte-position with respect to the beginning/start of the content 118, and the amount of content 118 (i.e. data segment size for the connection 128) subsequent to the byte-position of interest. Responsive to receipt of such a request 130, host 106 accesses and sends the requested portion of media content 118 to streaming module 116 in a corresponding response. Such a response is shown as an exemplary portion of "other program data" 126. This portion is communicated over the particular connection 128 that carried the request 130 begin addressed. Responsive to receiving responses to requests 130, streaming module 116 extracts the media content payload from the response, and decodes the extracted payload using standard media content decoding techniques. Such decoded media content is shown at client 102 as a respective portion of "other program data" 126. Media player 120 presents the decoded media content to a user.

Additional exemplary aspects of establishing multiple connections 128 and determining appropriate data segment sizes for respective connections 128 are now described.

Establishing Multiple Connections

Prior to establishing multiple connections 128, streaming module 116 establishes a single connection 128 to host 106. Streaming module 116 obtains header data associated with media content 118 from host 106 using the single connection 128. In one implementation, such header information provides streaming module 116 with information to determine, for example, play duration and/or file size, bit-rate indicating a minimum download speed for real-time playback of downloaded media content 134 by media player 120, stream properties, and/or so on. The size and content of the header data is arbitrary, being based on the particular media file format associated with media content 118.

Although media content playback generally improves by increasing the number of connections 128, complexity of buffer management and scheduling operations increases as the number of connections 128 increase. Additionally, because each request 130 sent over a connection 128 causes a certain amount of computational and data throughput overhead, media content 118 download delays can decrease responsive to decreasing the number of requests 130 sent over a connection 128. Thus, streaming module 116 estimates a substantially optimal number of connections 128 to establish based on competing playback quality and complexity of download and decoding buffer management criteria. (For purposes of exemplary illustration, an exemplary such download and decoding buffer(s) are shown as a respective portion of "other program data"). To this end, and in one implementation, streaming module 116 estimates current channel bandwidth $R_{chno}$ and request 130 overhead $T_{reqo}$.

More particularly, let $R_{play}$ represent bandwidth used for glitch-free playback of downloaded media content 134. Independent of overhead associated with multiple connections 128, an appropriate number of connections $N_{con}$ for streaming module 116 to schedule in one implementation could be provided as $R_{play}/R_{chno}$. However, scheduling multiple connections 128 involves time consuming configurations of each connection 128 to read/download specific amounts of media content 118 from particular offset positions in the file. Assume that overhead of sending requests 130 is constant when initializing connections 128. Thus, extending transmit time for each connection 128 being established to obtain longer data segments results in a smaller proportion of overhead compared with the transmit time. At the same time, a larger buffer is utilized to hold downloaded data segment; otherwise the buffer would overflow. Therefore, maximum continuous transmit time for each connection is limited by client buffer (streaming buffer) size $B_{max}$.

In view of the above, streaming module 116 identifies a smallest number of connections 128 to establish $N_{con}$ according to the following:

$$B_{max}/R_{play} \geq T_{req0} + B_{max}/(N_{con} \cdot R_{chn0}) \quad (1)$$

and $$N_{con} \geq \frac{R_{play}}{R_{chn0}} / \left(1 - \frac{R_{play} \cdot T_{req0}}{B_{max}}\right). \quad (2)$$

This minimum number of connections $N_{con}$ reduces overhead of sending requests 130. Additionally, $N_{con}$ is selected such that the connection overhead and time for associated buffer management operations still allow for real-time playback of downloaded media content 134.

Connection Transmit Rates

Streaming module 116 configures each connection 128 with a task to read a particular portion of media content 118. Each task is based on one or more of the following: (1) real-time parameters of each connection 128; (2) available transmit time for each connection 128; and, (3) received stream buffer fullness (status) at client 102. Real-time parameters for each connection 128 include, for example, data transmit rates in varying data throughput conditions and overhead of sending requests 130 over the connection. These parameters may differ across different connections 128. Streaming module 116 prioritizes use of connections 128 with faster transmit rates and lower request overhead for media content 118. For each connection i, two parameters (1) transmit rate for a connection 128 and (2) request 130 overhead time are respectively denoted by $R_{chni}$ and $T_{reqi}$. Streaming module 116 dynamically updates these parameters for at least a subset of connections 128 during media content streaming operations.

Streaming module 116 determines transmit rate for a connection 128 based on data length (d) and cost time (t) of recent r reading operations of a connection 128:

$$R_{chni} = \sum_{j=1}^{r} d_j / \sum_{j=1}^{r} t_j \quad (3)$$

Streaming module 116 determines request 130 overhead time $T_{reqi}$ for a connections 128 using a previous request overhead time value ($T'_{reqi}$) an indication of time ($t_{req}$) to send a last request 130 over the connection 128, and a weighting parameter $\alpha$ (e.g. $\alpha = 0.5$). In this implementation, the weighting parameter is an empirical parameter, which is analogous to a low-pass filter. The larger the weighting parameter, the less a current $t_{req}$ effects a connection 128. Specifically, and in this implementation, $T_{reqi}$ is determined according to the following:

$$T_{reqi} = \alpha \cdot T'_{reqi} + (1-\alpha) \cdot t_{req} \quad (4)$$

As a special case, if distance $\Delta D_i$ between next reading position and current reading position with media content 118 is relatively small (e.g., smaller than a configurable threshold distance), streaming module 116 may not send new request 130 to move to the next reading position if time to process the request may be greater than it would take to continue streaming data from a current position to the next position without interruption. In this scenario, streaming module 116 adjusts request overhead time $T_{reqi}$ as follows:

$$T_{reqi} = \min\{T_{reqi}, \Delta D_i / R_{chni}\} \quad (5)$$

Exemplary Buffer Management

To ensure glitch-free media streaming, streaming module 116 ensures that downloaded media content 134 is available in the download buffer before it is decoded by media player 120 for presentation to a user. To this end, streaming module 116 ensures that there is no gap (missing information or buffer underflow) between received portion(s) of media content 118 and decoded data for playback in the client buffer (decoded data buffer). Streaming module 116 prevents any such data gaps by right task assignment. Here the term task is for a data segment to be read by a connection. It does not include playback operations, etc. At a time instant each connection only has a single task. In other words, it only has a data segment to read. When it completes current task, a new task may be assigned to it again by the streaming module as described below. For each connection 128, such task assignment is based on available transmit time for the connection 128.

Figure 2:
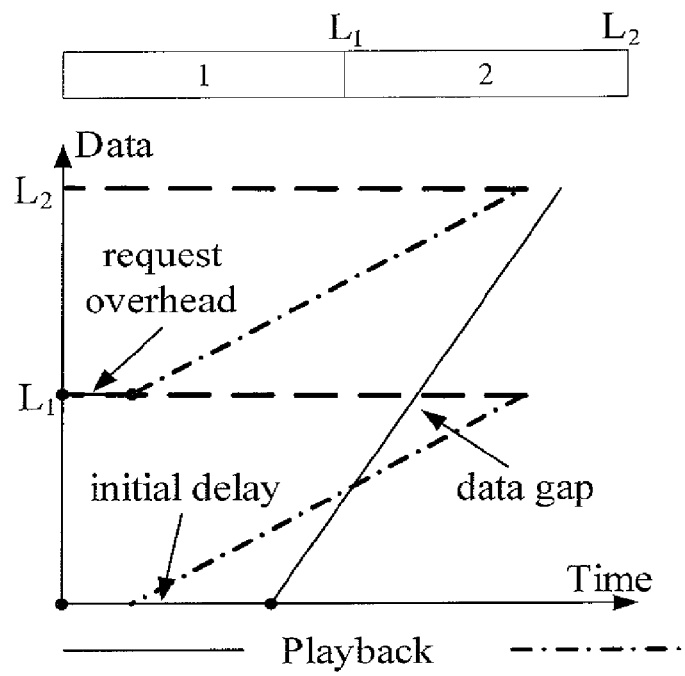
FIG. 2 shows exemplary evidence of data gap associated with assignment of data segments that are too large to transport protocol connections for media streaming.
Figure 3:
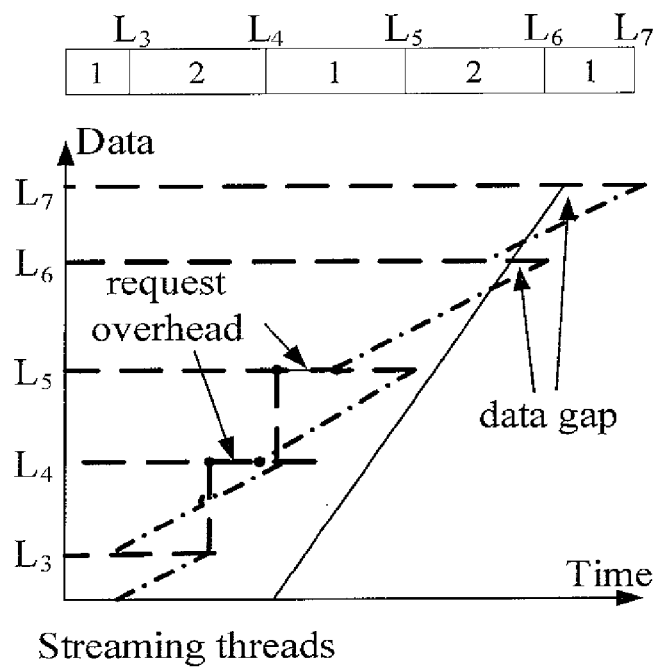
FIG. 3 shows exemplary evidence of data gap associated with assignment of data segments that are too small to transport protocol connections for media streaming.

FIGS. 2 and 3 illustrate exemplary aspects of media content data gap in a streaming download buffer. In the figures, $L_1$ on the vertical axis of the graph denotes the data segment assigned to connection 1, and $L_2$ on the vertical axis of the graph denotes the data segment assigned to connection 2. The solid lines in FIGS. 2 and 3 denote the playback. Its slope is the playback speed. In both figures, undesired data gap appears when connections do not download data in time that will be played back. Referring to FIG. 2, there is shown exemplary evidence of data gap associated with assignment of data segments that are too large to transport protocol connections for media streaming. Since data segments 1 and 2 are too large, data gap appears when data segment $L_1$ is not completely download yet by the connection 1 and the playback time is passed. FIG. 3 shows exemplary evidence of data gap associated with assignment of data segments that are too small to transport protocol connections for media streaming. As a result, the amount of time it takes to locate connections by sending requests to a remote computing device is too great, resulting in a potential for low quality media content playback operations.

In this implementation, streaming module 116 prevents data gaps by determining proper size of data segments associated with each connection 128 according to available transmit time for the connection 128 as follows. For each connection i, assume: (1) $P_i$ represents an accumulated length of all data segments from a reading starting point, wherein reading position precedes playback position before assignment to a connection 128; and (3) $D_i$ represents length of each data segment that is assigned to the connection 128. To prevent data gaps, the transmit time (denoted by the left side of equation (6)) is no more than the playback time (denoted by the right side of equation (6)):

$$\beta \cdot \left( T_{reqi} + \frac{D_i}{R_{chni}} \right) \leq \frac{P_i + D_i}{R_{play}} \quad (6)$$

Wherein beta is initially $\beta>1$ (e.g. $\beta=1.2$) to compensate for small decreases in network 104 conditions. In this implementation, beta is an empirical parameter.

The right side of equation (6) represents an amount of time to playback frames of downloaded media content 134 from $P_i$ to $P_i$ plus $D_i$. $T_{reqi}$ is the overhead time of each request. $D_i/R_{chni}$ is the transmission time for each data segment $D_i$. The left side of equation (6) is the total transmission time, which is not greater than the right side of equation (6) for glitch-free real-time playback of downloaded media content 134. Equation (6) prevents the occurrence of data gap, which represents a similar problem as buffer underflow. Analogously, streaming module 116 avoids buffer overflow.

Exemplary Task Assignment

Figure 4:
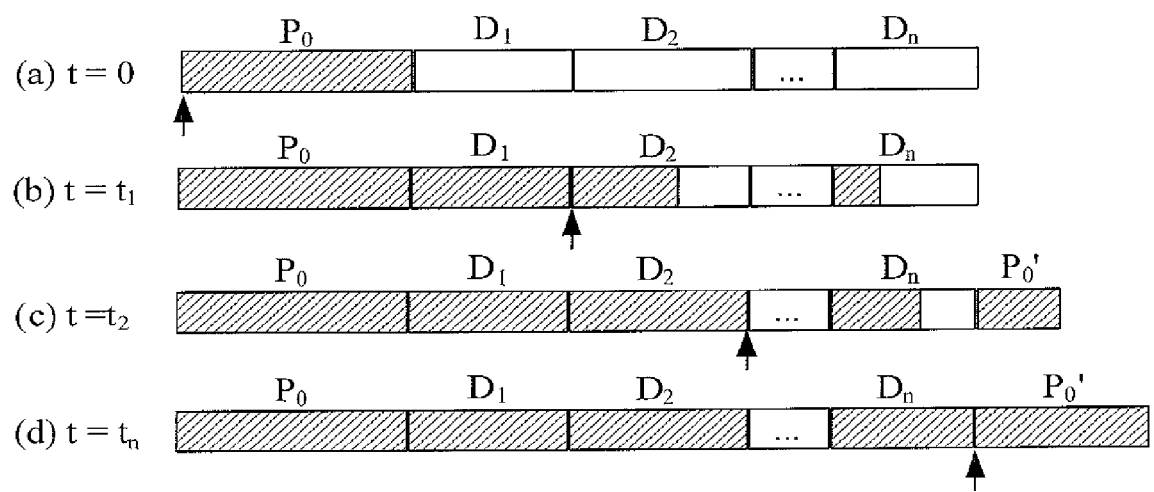
FIG. 4 shows exemplary transport protocol connection task assignment to prevent data gap during media streaming, according to one embodiment.

FIG. 4 shows exemplary transport protocol connection task assignment to prevent data gap during media streaming, according to one embodiment. Shadow in the FIG. 4 indicates that data that already exists in a client buffer (i.e., downloaded media content 134), and arrows denote respective playback positions. Suppose when streaming module 116 assigns a task that there are preceding data segments with the length $P_0$ in the client buffer. Suppose also that streaming module 116 wants to assign n ($n \leq N_{con}$) data segments ($D_1, D_2 \ldots D_n$) progressively to n connections 128, where n and $D_i$ are parameters to be determined. Assume the start time is zero, to eliminate data gap, streaming module 116 monitors each segment $D_i$ for completion of a current task before playback operations of media content player 120 require data from the data segment at time $t_i$. Therefore, for each segment i (i>1), length of preceding data $P_i$ is equal to sum of $P_{i-1}$ and $D_{i-1}$, while $P_1=P_0$. Then using formula (6), $D_i$ is given by:

$$D_i = \left( P_0 + \sum_{k=1}^{i-1} D_k - \beta \cdot R_{play} \cdot T_{reqi} \right) \frac{R_{chni}}{\beta \cdot R_{play} - R_{chni}} \quad (7)$$

Where j represents the connection 128, and j is assigned with segment of data $D_i$. For each segment $D_i$, j is selected from all free connections 128, to find a pair of parameters $R_{chnj}$ and $T_{reqj}$, which result in maximum value of $D_i$.

Every time one data segment i of length D (i.e., $D_i$) is obtained (i.e., a data segment has been downloaded in the streaming buffer), streaming module 116 performs several checks to determine whether the connection 128 should still be tasked to obtain another data segment. For example, when transmit speed of a connection 128 is less than playback speed, and when the connection completes the assigned task, playback time is close. If the same connection is assigned a task to read the next data segment, the data gap will appear. To address this scenario, a different connection is assigned the task to fetch the next data segment in advance. Only if a first check passes, will streaming module 116 move to the subsequent check, and so on. If a check fails, streaming module 116 stops task assignment for that connection 128 and moves to a next available connection. An exemplary set of such checks/ evaluations are now described.

Streaming module 116 first determines if $D_i$ is a valid value. If $D_i$ is less than a threshold $D_{min}$ (both $D_i$ and $D_{min}$ represent data length), streaming module 116 will not assign any more tasks to a connection 128, since little time could be saved, while risk of extra overhead caused by network 104 data throughput increases. That is, if $D_i$ is too short, a new connection 128 will not be tasked to obtain it. Instead, we use the connection assigned to $D_i-1$ to continuously download $D_i$. $D_{min}$ is a empirical parameter. For example, it is less than the time cost of establishing a connection 128.

Additionally, streaming module 116 checks for buffer overflow conditions while assigning new tasks to connection(s) 128. Assume m frames had been read after transmission on a connection 128 has started, then size of client buffer is given by:

$$B(m) = P_0 - m \cdot D_{frm} + \sum_{i=1}^{n} D'_i(m) \quad (8)$$

Where $D_{frm}$ stands for average frame size of the media content 118 file, which is estimated at the initialization stage, and $D'_i(m)$ stands for length of data which had been read from segment $D_i$ into client buffer. $D'_i(m)$ starts growing after a connection 128 finishes locating at start position of $D_i$. Streaming module 116 evaluates $B(m)$ to determine whether it exceeds client buffer size $B_{max}$. Note that as shown in FIG. 4(c) and (d), connections 128 that finish their respective task will continue to read more data, which is denoted by $P'_0$, to compose preceding data for next assignment, as described below with respect to "Dynamic Task Scheduling".

Dynamic Task Scheduling

A connection 128 may not finish a particular task at the intended time due to fluctuant network 104 conditions. Therefore, streaming module 116 implements dynamic scheduling operations. When one connection 128 finishes reading a piece of data, Streaming module 116 estimates whether the connection will be able to complete a subsequent task in time using the latest data transmit rate associated with the connection 128. If streaming module 116 determine that the connection will need some assistance to complete the task, and if other unused connections 128 are available, streaming module 116 generates an estimate to determine whether the connection should be assisted.

For example, assume connection i with data length $D_{rem}$ to read is in need of assistance, and connection j tries to assist i by reading a tail portion of $D_{rem}$ with length $D_{tail}$. Let these two connections finish their respective task at the same time. Thus:

$$D_{tail} = \frac{R_{chnj} \cdot (D_{rem} - R_{chni} \cdot T_{reqj})}{R_{chni} + R_{chnj}} \quad (9)$$

Figure 5:
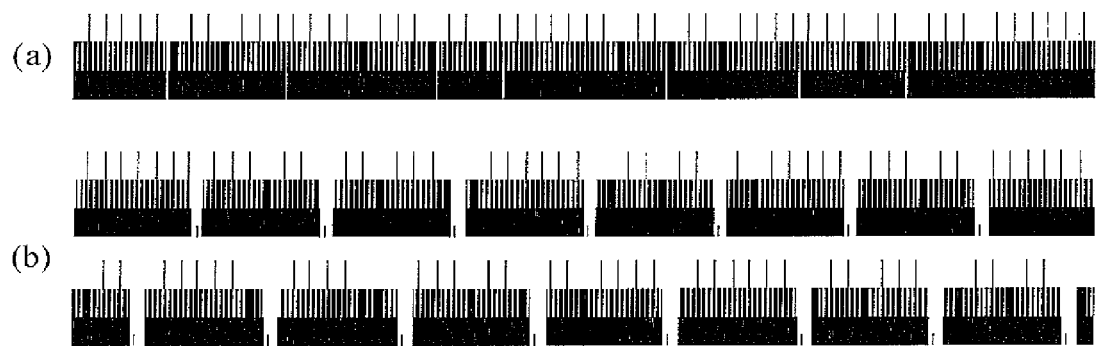
FIG. 5 shows exemplary bandwidth utilization for a channel of a single connection and for two channels of multiple connections, according to one embodiment.

FIG. 5 shows exemplary bandwidth utilization for a channel of a single connection and for two channels of multiple connections, according to one embodiment. The horizontal direction of FIG. 5 represents time and the vertical direction represents actual transmit rate. FIG. 5(a) is the actual transmit rate of one connection which varies in time and FIG. 5(b) is the actual transmit rates of two connections. Please observe that the late case is almost double the transmit rate than the first case.

For the same reason as checking validity of $D_i$ in task assignment operations, streaming module 116 implements such scheduling if $D_{tail} \geq D_{min}$. $D_{tail}$ should be also more than $D_{min}$, otherwise it is not tasked to another connection 128.

Exemplary Procedure

Figure 6:
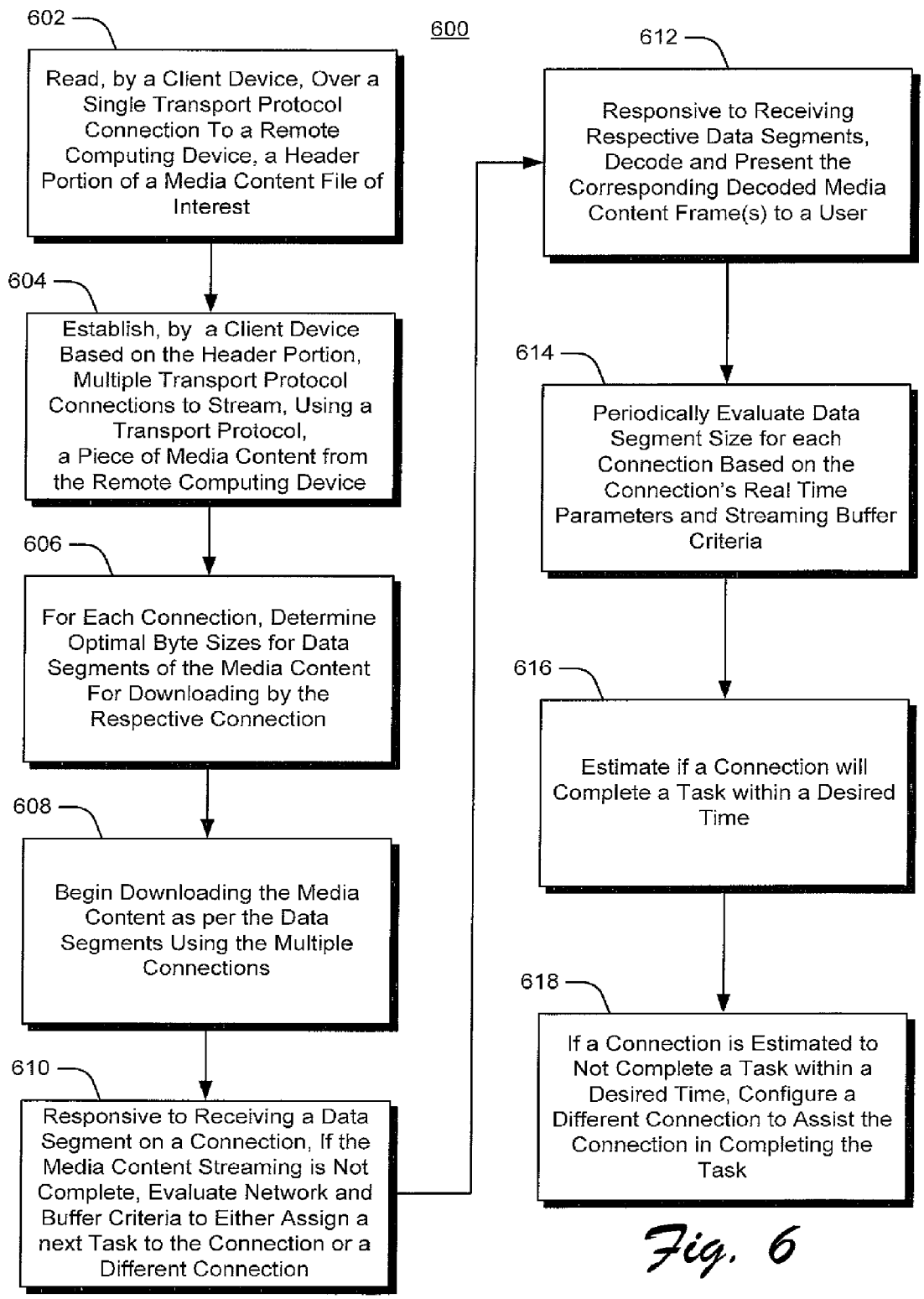
FIG. 6 shows an exemplary procedure for glitch-free media streaming, according to one embodiment.

FIG. 6 shows an exemplary procedure 600 for glitch-free media streaming, according to one embodiment. The operations of procedure 600 for glitch-free media streaming provide a client-based solution to stream media content hosted by a remote computing device for presentation to a user at the client. The operations of procedure 600 are independent of whether the remote computing device provides media content streaming services. For example, in one implementation, the remote computing device does not provide media content streaming or seeking services, but provides web server services that respond to transport protocol byte-range requests to read/download/access media content.

For purposes of discussion, the operations of FIG. 6 are described in reference to components of FIG. 1. For instance, in the description, the left-most digit of a component reference number identifies the particular Figure in which the component first appears. Additionally, although the operations of FIG. 6 are shown in a certain numerical order, the operations of one block do not necessarily come before or after the operations of a subsequently numbered block. For example, the operations of block 610 may be performed in parallel, before, or after the operations of block 612. In another example, the operations of block 614 can be performed at any time after the transport protocol connections have been established to download respective data segments of media content 118. Thus, the ordering of the respective operational blocks 602 through 618 is an exemplary ordering, and different arbitrary ordering of block operations may reflect an implementation of procedure 600 at any particular time.

At block 602, a client device uses a single transfer protocol connection to a remote computing device to read a header portion of a media content file of interest from a remote computing device. In one implementation, for example, streaming module 116 reads header information of media content 118 from remote computing device ("host") 106. In this implementation, streaming module 116 utilizes a single transfer protocol connection 128 to access the header information from host 106. In this implementation, host 106 represents, for example, a Web server that provides user access to media content 118, for example, on a web page, and/or so on. In one implementation, the accessed header information provides streaming module 116 with information to determine, for example, play duration and/or file size of the media content, a bit-rate indicating a minimum download speed for real-time playback of corresponding downloaded media content 134 (e.g., by media player 120), stream properties, and/or so on.

At block 604, multiple transport protocol connections are established by the client based at least on information in the read header portion of the media content file of interest. In one implementation, for example, streaming module 116 of a client device 102 establishes multiple transport protocol connections 128 to stream media content 118 from a remote computing device 106. In this implementation, the multiple transport protocol connections 128 represent HTTP connections. In another implementation, respective ones of connections 128 represent other types of transport protocol connections that support byte-range requests to access media content. Streaming module 116 determines an optimal number of connections 128 to establish for glitch-free media content streaming by balancing, for example, computationally demanding connection and request overhead and streaming buffer management operations such that overhead of sending requests for portions of the media content is minimized.

At block 606, streaming module 116 calculates respective data segment sizes to associate with each of the established connections 128. Specifically, streaming module 116 determines an optimal per-connection 128 data segment sizes for the connection 128 to use to download corresponding data segments of media content 118 (shown at client 102 as downloaded media content 134). A particular data segment size determined for one connection 128 may be different than the particular data segment size determined for a different connection 128. This is because data segment size calculations are determined on a connection-by-connection basis in view of data transmit time over the connection, client streaming buffer statuses (e.g., fullness, etc) at the time that the data segment size determination is being made, network 104 data throughput conditions, overhead of sending requests 130 pieces of media content 118 over the connection 128, and/or so on. (As described below in reference to block 614, streaming module 116 periodically re-determines and evaluates such criteria to maintain optimal data segment sizes for connections 128 in view of varying network data throughput conditions).

Operations of block 608 download media content from the remote computing device over respective ones of the established connections using each connection's corresponding data segment size. For example, in one implementation, streaming module 116 downloads media content 118 from host 106 over respective ones of the established connections 128 using each connections corresponding data segment size. To this end, for each connection 128 and being utilized, streaming module 116 communicates a byte-range request to host 106 to access a respective specified portion of the media content 118. The respective specified portion begins at a specified location of the media content 118 and has a size of data segment size. Although use of byte-range requests are known, use of byte-range requests to cooperatively download a piece of media content for glitch-free presentation to a user using multiple established connections in the manner described with respect to system 100, is novel. In this implementation, streaming module 116 prioritizes use of respective ones of connections 128 such that connections with faster transmitter rates and lower request 130 overhead are used to access media content 118.

At block 610, responsive to receiving a data segment of media content on a connection, if media content streaming operations are not complete, evaluate network and buffer criteria to determine whether to assign a next task to read the another portion of the media content to the connection or to a different connection. Media content streaming operations are not complete when the entire piece of media content has not been downloaded for presentation to a user. In one implementation, for example, responsive to receiving a data segment over a connection 128, streaming module 116 determines whether to assign a next task to read another portion of media content 118 to the connection 128 or to a different connection 120. This determination is made to minimize overhead caused by network 104 data throughput increases associated with establishing new connections 128, request 130 transmit overhead, size of the client streaming buffer in view of speed that data is removed from the buffer for playback, average frame size of media content 18, the length of the data segment size that has been read into the client streaming buffer, and/or so on.

At block 612, data segments comprising frames of media content in the client streaming buffer are removed from the buffer for decoding and presentation to a user. In one implementation, such data segments are represented by downloaded media content 134 of FIG. 1. In one implementation, media player 120 removes frames of downloaded media content 134 from the client streaming buffer for presentation to a user (e.g., via display device 132). It can be appreciated that the operations of block 612 and block 610 may be implemented in parallel with each other and other operations of procedure 600.

At block 614, per-connection assignment of data segment size is periodically reevaluated based on the connection's real-time parameters and streaming buffer criteria, as discussed above with respect to block 606. In one implementation, streaming module 116 reevaluates per-connection 128 assignment of data segment size based at least on the connections real-time parameters and streaming buffer criteria to ensure glitch-free media content downloaded media content 134 presentation to a user. Operations of block 614 can be implemented in parallel, before, and/or after other operations of procedure 600 (e.g., operations of blocks 608, 610, 612, 616, and 618.

Operations of block 616 estimate whether a connection will complete a task within the desired time frame. In this implementation, streaming module 116 estimates whether a connection 128 will complete a task to access one or more portions (i.e., data segments at specific locations) of media content 118 in a particular time frame. In this implementation, this determination is made in view of the current data transmit rate associated with the connection 128. Additionally, the particular timeframe is a timeframe that has been determined to negate any opportunity for data gap in the client streaming buffer (i.e., downloaded media content 134). Operations of block 618 assign the task to a different connection when it has been estimated that the connection will not complete the task within the desired time frame in view of the current data transmit rate on the connection. For example, in one implementation, streaming module 116 assigns the task to a different connection 128 when streaming module 116 determines that the original connection 128 will not complete the task within the desired time frame. It can be appreciated that the operations of blocks 616 and 618 can be implemented in parallel with the operations of other blocks of procedure 600.

CONCLUSION

Although glitch-free media streaming has been described in language specific to structural features and/or methodological operations or actions, it is understood that the implementations defined in the appended claims are not necessarily limited to the specific features or actions described. For example, the above described systems and methods for glitch-free media streaming have been described with respect to a client-based solution to strain a piece of media content from a remote computing device to a client computing device. These systems and methods can also be used to provide client-based random seek capabilities to facilitate rapid location of media clips related to user search queries, for example, in an application providing a user with fast forward and backward media browsing, jumping to a particular portion of the media, etc. Thus, the specific features and operations discussed above with respect to FIGS. 1-6 are disclosed as exemplary forms of implementing the claimed subject matter.

The invention claimed is:

1. A computer-implemented method with at least one client computing device with a media player and at least one remote computing device, comprising:

indexing media content by a search service;

evaluating text input by a user to return a URL listing of remote computing devices including at least one remote computing device hosting the indexed media content relating to the text input;

providing, by the at least one client computing device with a media player, media content streaming services to the user to stream the indexed media content from the at least one remote computing device, the providing being independent of whether the at least one remote computing device implements media content streaming services, the at least one client computing device with a media player providing the media content streaming services by:

establishing, multiple transport protocol connections to the at least one remote computing device;

tasking each connection of at least a subset of the multiple transport protocol connections to read a particular data segment of the indexed media content, the data segment identifying a respective offset into the indexed media content and a number of bytes to read;

managing connection tasks to regulate data input into a streaming media buffer for storing received data segments of the indexed media content;

removing data from the streaming media buffer for real-time playback to the user;

determining the number of bytes for each connection based on periodic determinations of the transmit rate on the connection; and requesting overhead on each connection, byte-size of the media content, and bit-rate at which the indexed media content was encoded.

2. The computer-implemented method of claim 1, wherein the multiple transport protocol connections are based on HTTP.

3. The computer-implemented method of claim 1, wherein the establishing of the multiple transport protocol connections comprises:

estimating an optimal number of the multiple transport protocol connections to establish based on criteria for playback quality, data segment downloading, and buffer management; and wherein the multiple transport protocol connections established is the optimal number of connections.

4. The computer-implemented method of claim 1, wherein the managing of the connection tasks comprises evaluating an amount of the indexed media content received in the streaming media buffer and a rate at which data is being taken out of the streaming media buffer for real-time streaming playback to the user.

5. The computer-implemented method of claim 1, further comprising, before establishing the multiple transport protocol connections:

requesting media content header information from the at least one remote computing device to identify a file size of the indexed media content, transmit times, request overhead, a bit-rate indicating a minimum streaming speed for real-time playback of media content to a user; and wherein one or more sizes of the multiple data segment sizes are based on information determined from requesting the media content header information.

6. The computer-implemented method of claim 1, wherein the managing of the connection tasks to regulate data input into the streaming media buffer further comprises:

monitoring each connection for completion of a respective current task; and responsive to the monitoring:

(a) determining whether to task the connection at task completion to get a different data segment of the indexed media content, whether to task a different connection of the multiple transport protocol connections to read the different data segment, or whether to task a different connection of the multiple transport protocol connections to assist the connection in completing the respective current task by reading at least a portion of the data segment; and (b) checking whether to change the respective data segment size for the connection based at least on buffer status, transmit times, and request overhead on the connection.

7. The computer-implemented method of claim 6, wherein the determining further comprises:

comparing transmit speed of the connection to speed at which the media player is removing bytes from the streaming media buffer to determine if data gap will occur unless the next data segment is tasked to the different connection; and checking for buffer overflow conditions.

8. A computer-implemented method with at least one client computing device with a media player and at least one remote computing device, comprising:

indexing media content by a search service;

evaluating text input by a user to return a URL listing of remote computing devices including the at least one remote computing device hosting the indexed media content relating to the text input;

requesting media content header information from the at least one remote computing device to identify file size of the indexed media content, transmit times, request overhead, and bit-rate indicating a minimum streaming speed for real-time playback of the indexed media content to the user;

establishing, by the client computing device with a media player, multiple transport protocol connections to the at least one remote computing device, the multiple transport protocol connections being established to download the indexed media content from the at least one remote computing device;

reading, by the client computing device, each bit of the indexed media content using at least a subset of the multiple transport protocol connections by:

assigning each connection of the at least a subset of the multiple transport protocol a respective task to read a respective data segment of the indexed media content, the respective data segment indicating a respective offset into the indexed media content and a respective data segment size;

monitoring each connection for completion of the respective task;

responsive to the monitoring:

(a) determining whether to again task the connection at completion of the respective task to get a next data segment at a next offset into the indexed media content, whether to task a different connection of the multiple transport protocol connections to read the next data segment, or whether to task a different connection of the multiple transport protocol connections to read at least a portion of the next data segment to assist the connection is completing the respective task; and (b) checking whether to change the respective data segment size for the connection;

responsive to the assigning, receiving, by the client computing device, a data segment of the indexed media content into a buffer; and removing, by the client computing device, data from the buffer for real-time playback to the user.

9. The computer-implemented method of claim 8, wherein the multiple transport protocol connections are HTTP connections.

10. The computer-implemented method of claim 8, wherein the establishing of the multiple transport protocol connections further comprises:

estimating an optimal number of the multiple transport protocol connections to establish based on criteria for playback quality, downloading data segments, and streaming buffer management; and wherein the multiple transport protocol connections established is the optimal number of connections.

11. The computer-implemented method of claim 8, wherein the determining of whether to again task the connection at completion of the respective task to get the next data segment at the next offset or whether to task the different connection to read the next data segment further comprises:
- comparing transmit speed of the connection to playback speed to determine if data underflow in the buffer will occur unless the next data segment is tasked to the different connection; and
- checking for buffer overflow conditions.

12. The computer-implemented method of claim 8, wherein the monitoring the connection is based on an amount of the indexed media content received in the buffer and a rate at which data is being taken out of the buffer for real-time streaming playback to the user.

13. A computing device with a media player comprising:
- a processor; and
- a memory coupled to the processor, the memory comprising computer-program instructions for execution by the processor, the computer-program instructions for performing operations comprising:
  - indexing media content by a search service;
  - evaluating text input by a user to return a URL listing of remote computing devices including at least one remote computing device hosting the indexed media content relating to the text input;
  - identifying an optimal number of HTTP connections to establish between the computing device with a media player and the at least one remote computing device that is hosting the indexed media content,
    - the identifying being based at least on one or more of a current channel bandwidth on a connection to the at least one remote computing device, overhead of sending an HTTP request to the at least one remote computing device over the connection, speed at which portions of the indexed media content that have been downloaded to the computing device with a media player are removed from a buffer, size of the buffer, requesting media content header information to identify file size of the indexed media content, transmit times, bit-rate indicating a minimum streaming speed for real-time playback of the indexed media content;
  - establishing, the optimal number of HTTP connections to the at least one remote computing device;
  - configuring each of the HTTP connections to read a particular number of bytes of the indexed media content at a particular offset into the indexed media content, the particular number of bytes being less than a total size of the piece of the indexed media content; and
  - managing the indexed media content data segment download operations over each of the HTTP connections in view of fluctuating network bandwidth conditions to regulate data input into the buffer and provide a real-time media playback operation with a consistent stream of the indexed media content bits at a particular playback speed.

14. The computing device with a media player of claim 13, wherein the managing of the media content data segment download operations over each connection further comprises:
- monitoring the connection for completion of a respective current task to download a data segment of the indexed media content; and
- responsive to the monitoring:
  - (a) determining whether to task the connection at task completion to get a different data segment of the indexed media content, whether to task a different connection of the multiple transport protocol connections to read the different data segment, or whether to task a different connection of the multiple transport protocol connections to assist the connection in completing the respective current task by reading at least a portion of the data segment; and
  - (b) checking whether to change the respective data segment size for the connection based at least on buffer status, transmit time; and
  - (c) requesting overhead on the connection.

15. The computing device with a media player of claim 14, wherein the determining further comprises:
- comparing transmit speed of the connection to speed at which the media player is removing bytes from the buffer to determine if data gap will occur unless the next data segment is tasked to the different connection; and
- checking for buffer overflow conditions.

16. The computing device with a media player of claim 13, further comprising:
- determining, for each connection, the particular number of bytes based on periodic determinations of the transmit rate on the connection; and
- requesting overhead on the connection, byte-size of the indexed media content, and bit-rate at which the indexed media content was encoded.

17. The computing device with a media player of claim 16, wherein the determining of the particular number of bytes further comprises:
- determining a distance between a current reading position in the indexed media content and a next reading position in the indexed media content;
- if the distance is smaller than a threshold distance:
  - (a) increasing the particular number of bytes to include bytes associated with the next reading position; and
  - (b) adjusting request overhead time to reflect that the connection will be tasked to read a larger data segment size.

* * * * *